March 5, 1929.    R. E. ACKLEY    1,704,419
CHAIN FOR PRESSURE BELTS
Original Filed May 27, 1927    2 Sheets-Sheet 1

Inventor:
Raymond E. Ackley,
By Dyrenforth, Lee, Chritton & Wiles
Attys.

March 5, 1929.  R. E. ACKLEY  1,704,419
CHAIN FOR PRESSURE BELTS
Original Filed May 27, 1927  2 Sheets-Sheet 2
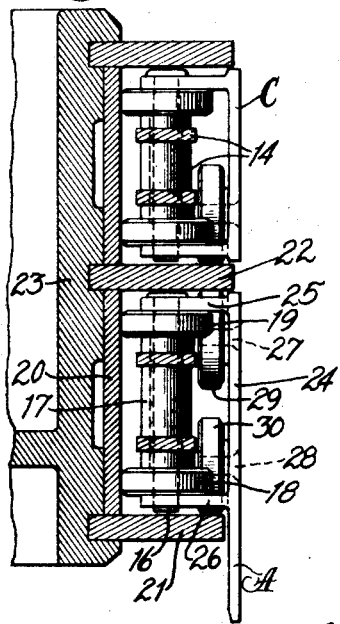
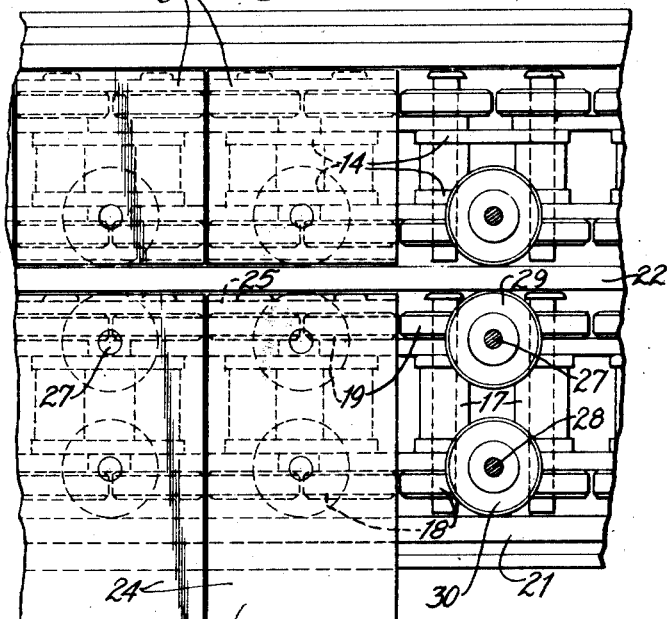
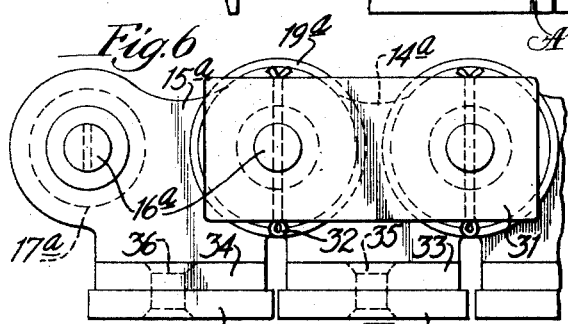
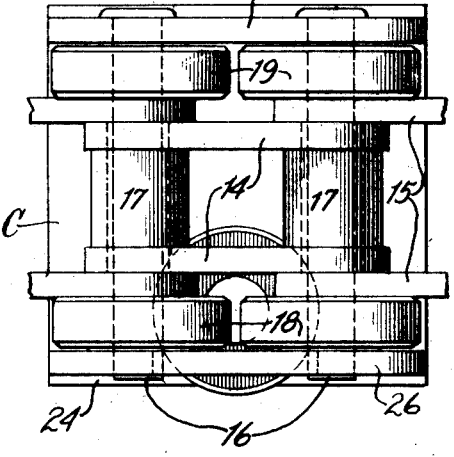
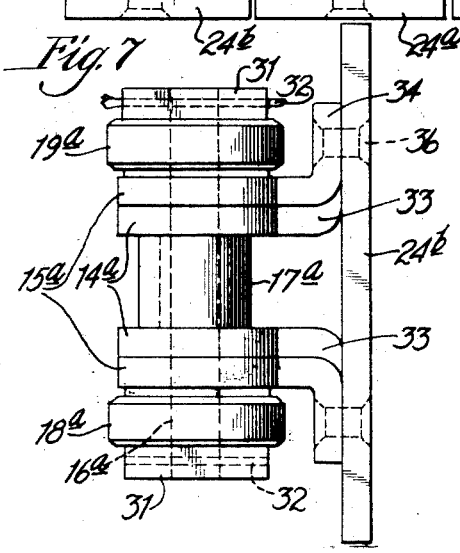
Inventor:
Raymond E. Ackley,
By Dyrenforth, Lee, Chritton & Wiles,
Attys.

Patented Mar. 5, 1929.

1,704,419

UNITED STATES PATENT OFFICE.

RAYMOND E. ACKLEY, OF CHICAGO, ILLINOIS, ASSIGNOR TO R. R. DONNELLY & SONS COMPANY, A CORPORATION OF ILLINOIS.

CHAIN FOR PRESSURE BELTS.

Original application filed May 27, 1927, Serial No. 194,645. Divided and this application filed November 5, 1927. Serial No. 231,332.

This invention relates to a chain for pressure belts and the like such as is shown in my application for straight-line book binding machine, Serial No. 194,645, filed May 27, 1927, and is a division thereof.

An object of the invention is to provide a belt or chain which will operate under quite heavy pressure as where two of the belts are used in superimposed position and are driven in the same direction and at the same speed so that a book or the like may be gripped between them and carried along while one or more operations may be performed on it. Thus, the pressure belt may be required to take quite a heavy sidewise thrust in addition to the pressure which is required to grip the book.

Another object is to provide a pressure belt of this kind which is simple and economical to manufacture and which is strong and rugged in construction.

These and other objects as will hereinafter appear are accomplished by this invention which is fully described in the following specification and shown in the accompanying drawings, in which:

Fig. 3 is a partial enlarged section through one of the pressure belts;

Fig. 4 is a front elevation of the pressure belt;

Fig. 5 is an enlarged rear view of one section or link of the upper pressure belt;

Fig. 6 is a top plan view of a modified form of chain; and

Fig. 7 is an end elevation of the same.

Figure 2:
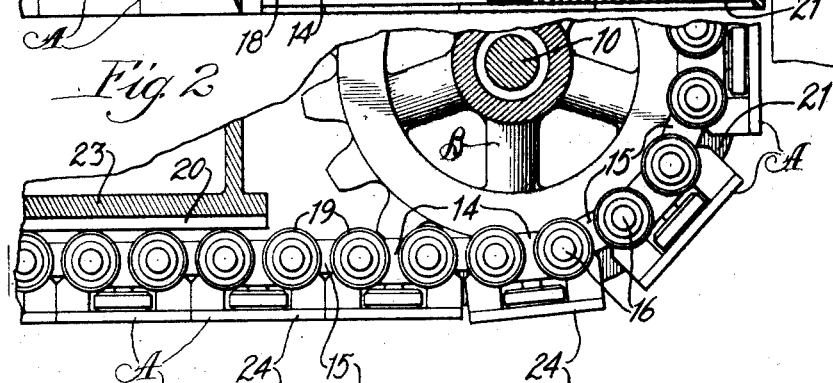
Fig. 2 is a partial sectional view on the line 2 of Fig. 1 showing two of the pressure belts or chains.
Figure 2:
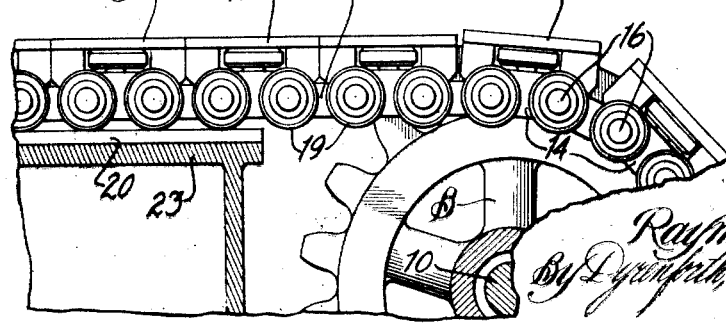

The embodiment illustrated comprises two similar pressure belts or chains A facing each other as shown in Fig. 2 and driven at the same speed by means of sprockets B. Each sprocket is keyed to a shaft 10 which has a worm wheel 11 secured thereon and meshing with a worm 12 on a shaft 13 which is driven by any suitable source of power.

Referring to Figs. 3, 4 and 5, the lower pressure belt A comprises a chain made up of inner and outer links 14 and 15 respectively which are pivotally secured together by means of pins 16. Spacer rollers 17 are used to separate the inner links 14 and these engage the teeth of the sprocket B. The pins 16 extend beyond the links 14 and 15 and have rollers 18 and 19 journalled thereon. These rollers are adapted to roll on a backplate 20 which is preferably carried between side plates 21 and 22, all these plates being suitably mounted on a supporting frame 23.

A pressure belt is supplied on its front face with a pressure plate 24 which has ears 25 and 26 by means of which it is mounted upon two adjacent pins 16 so that the plate 24 serves also as a link in the chain.

The pressure plate 24 is provided with pins 27 and 28 upon which are journalled rollers 29 and 30 which are adapted to roll upon the side plates 22 and 21 respectively.

It will be understood from the foregoing that lateral pressure exerted by a book or the like placed between two of the adjacent chains A will be transmitted through the pins 16 to the rollers 18 and 19 which bear upon the hardened and ground steel plates 20. While so carried between the chains various operations may be performed upon the book and this may exert a pressure up or down which will be taken by the rollers 29 and 30 which bear upon the side plates 22 and 21.

Figure 1:
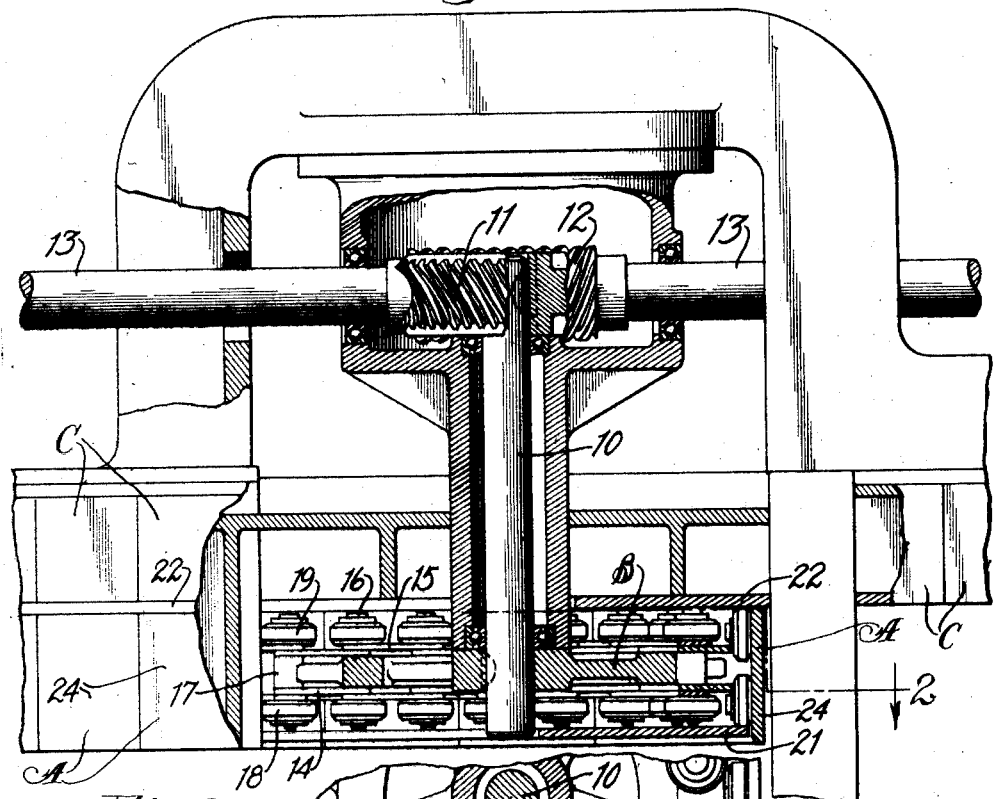
Figure 1 is an assembly view of the pressure belt or chain showing the sprocket for driving the same.

It will be noted from Fig. 1, that the pressure belt A stops at the sprocket B but that the upper pressure belt C which is similar to the pressure belt A but differs therefrom in being somewhat simpler in form continues past the shaft 10. The purpose of this is to provide a continuous belt C which runs throughout the length of the machine as is described in more detail in the patent application above referred to.

In Figs. 6 and 7 is shown a modified form of the chain belt in which links 14$^a$ and 15$^a$ are separated by spacers 17$^a$ and are pivotally connected by pins 16$^a$ which pass also through rollers 18$^a$ and 19$^a$ and through blocks 31 at the top and bottom which serve as wearing shoes as will later be explained. Cotter pins 32 pass through the shoes 31 and through the pins 16$^a$ and hold these pins in place.

On each link 14$^a$ and 15$^a$ are outwardly projecting lugs 33 and 34 by means of which plates 24$^a$ and 24$^b$ may be secured by rivets 35 and 36. The shoes 31 take the place of the rollers 18 and 19 of the form shown in Fig. 3 and slide upon the plates 21 and 22. It will also be noted that the plates 24ª and 24ᵇ are only half as broad as the plates 24.

Thus, the upper pressure belt C retains the book from the time it enters the machine until it leaves, while a series of lower pressure belts A may be used at different positions in the machine to perform various functions.

It will be seen from the foregoing that a very simple and efficient form of pressure belt is provided and one which needs relatively little attention and repair.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a chain for pressure belts and the like, side links, pins connecting said links, rollers on said pins, back plates on which said rollers are adapted to roll, a pressure plate carried by said chain, a side plate at an angle to said back plate, rollers journalled on pins carried by said chain and adapted to roll on the side plate, a support for said side and back plates whereby said belt is adapted to take pressure exerted in different directions against said belt at right angles to its direction of travel.

2. In a chain for pressure belts and the like, side links, pins connecting said links, rollers on said pins lying outside said links, rollers on said pins, back plates on which said rollers are adapted to roll, a pressure plate carried by said chain, a side plate at an angle to said back plate, rollers journalled on pins carried by said chain and adapted to roll on the side plate, a support for said side and back plates whereby said belt is adapted to take pressure exerted in different directions against said belt at right angles to its direction of travel.

3. In a chain for pressure belts and the like, side links, pins connecting said links, rollers on said pins lying outside said links, rollers on said pins, back plates on which said rollers are adapted to roll, a pressure plate carried by said pins, a side plate at an angle to said back plate, rollers journalled on pins carried by said chain and adapted to roll on the side plate, a support for said side and back plates whereby said belt is adapted to take pressure exerted in different directions against said belt at right angles to its direction of travel.

4. In a chain for pressure belts and the like, side links, pins connecting said links, rollers on said pins, back plates on which said rollers are adapted to roll, a pressure plate carried by said chain, a side plate substantially at right angles to said back plate, rollers journalled on pins carried by said chain and adapted to roll on the side plate, a support for said side and back plates whereby said belt is adapted to take pressure exerted in different directions against said belt at right angles to its direction of travel.

5. In a chain for pressure belts and the like, side links, pins connecting said links, rollers on said pins, back plates on which said rollers are adapted to roll, a pressure plate carried by said chain, a side plate at an angle to said back plate, rollers journalled on pins carried by said pressure plate and adapted to roll on the side plate, a support for said side and back plates whereby said belt is adapted to take pressure exerted in different directions against said belt at right angles to its direction of travel.

In testimony whereof I have hereunto set my hand this 4th day of October, 1927.

RAYMOND E. ACKLEY.